United States Patent [19]

Phillips

[11] Patent Number: 5,708,428
[45] Date of Patent: Jan. 13, 1998

[54] METHOD AND APPARATUS FOR PROVIDING BACKLIGHTING FOR KEYPADS AND LCD PANELS

[75] Inventor: John Charles Phillips, Raleigh, N.C.

[73] Assignee: Ericsson Inc., Research Triangle Park, N.C.

[21] Appl. No.: 761,327

[22] Filed: Dec. 10, 1996

[51] Int. Cl.$^6$ .................................................. H03K 17/94
[52] U.S. Cl. ................ 341/22; 340/815.45; 340/825.82; 200/314; 379/368
[58] Field of Search ............... 200/54, 314; 340/815.45, 340/815.55, 815.73, 815.42, 815.49, 825.82; 379/368, 369, 370, 433; 341/22; 345/170, 173, 176

[56] References Cited

U.S. PATENT DOCUMENTS

| | | | |
|---|---|---|---|
| 4,937,408 | 6/1990 | Hattori et al. | 200/314 |
| 5,097,396 | 3/1992 | Myers | 362/32 |
| 5,149,923 | 9/1992 | Demeo | 200/5 |
| 5,285,037 | 2/1994 | Baranski et al. | 200/314 |
| 5,384,459 | 1/1995 | Patino et al. | 250/229 |
| 5,397,867 | 3/1995 | Demeo | 200/5 |
| 5,401,927 | 3/1995 | Lundell et al. | 200/314 |
| 5,432,684 | 7/1995 | Fye et al. | 200/314 |
| 5,477,430 | 12/1995 | LaRose | 200/314 |
| 5,510,782 | 4/1996 | Norris et al. | 341/22 |
| 5,555,550 | 9/1996 | Kaschke | 379/368 |

*Primary Examiner*—Jeffery Hofsass
*Assistant Examiner*—Timothy Edwards, Jr.
*Attorney, Agent, or Firm*—Jenkens & Gilchrist, P.C.

[57] ABSTRACT

Light-emitting diodes are embedded, preferably by insert molding, directly into the translucent elastomeric material forming a keypad or surrounding structure adjacent the light guide of a liquid crystal display panel. The electrical contacts of the LEDs are maintained in bias contact with contact pads provided on the secondary surface of a printed circuit board. The bias contact is preferably provided by a cover assembly which provides a compressive force against the elastomeric keypad when assembled with the printed circuit board and keypad. The present invention enables the construction of a printed circuit board having all of the electrical components disposed on only the primary side of the board, thereby permitting a simpler layout of the electrical circuitry on the PCB and the construction of a thinner keyboard assembly.

24 Claims, 3 Drawing Sheets

METHOD AND APPARATUS FOR PROVIDING BACKLIGHTING FOR KEYPADS AND LCD PANELS

BACKGROUND OF THE INVENTION

1. Technical Field

This invention relates generally to a keyboard assembly, and more particularly to a keyboard assembly in which the keypad and/or an LCD panel are backlit to provide lighting under low light or dark conditions.

2. History of Related Art

The keypad and the liquid crystal display (LCD) of many instruments, for example, portable telecommunications instruments such as cellular telephones, require backlighting or other means of illumination in order to be usable under low light and dark conditions. Backlighting is typically accomplished by using light-emitting diodes (LEDs) which are soldered surface-mounted devices (SMDs) on a printed circuit board (PCB). The manufacture of instruments having backlit keypads or LCDs with components mounted on both sides of the printed circuit board is expensive due to the requirement to solder components on both the primary and secondary sides of the board. Such operations require two trips through a surface-mounted device line, or robots or humans are required to individually solder components on the second side. Consequently, ideal instrument design should have the main circuitry mounted only on the primary side of the PCB, with man-machine interface (MMI) items mounted on the secondary side of the board. Typically, MMI components such as the keypad, earphone speaker, microphone, and liquid crystal display can be designed to use elastomeric or other type of solderless connectors to make electrical contact with the PCB. Moreover, LEDs generally are not designed to be mounted without solder.

Thus, even if none of the main circuitry is mounted on the second side of the PCB, additional soldering must be done on the secondary side just to mount the LEDs for backlighting, adding considerable cost and time to the assembly operation. Heretofore, the usual PCB design assumes that since the LEDs must be soldered anyway, one might as well mount other soldered components on the secondary side of the PCB since it will have to go through a second SMD line for the LEDs. However, if the PCB design does nothing to eliminate components soldered to the secondary side of the printed circuit board, then the cost of a second SMD line continues to exist and the instrument is therefore not manufactured at the lowest possible cost.

One solution to the above problems is to mount the LEDs on a primary side of the PCB, with the light produced by the LED shining through a hole drilled in the printed circuit board and illuminating the keypad and LCD disposed adjacent the secondary side of the PCB. However, this solution has two shortcomings. Light transmission through the printed circuit board is not very good due to the increased complexity of the optical path, and placing the LEDs on the primary side makes efficient board layout extremely difficult. Not only are more components being added to a typically crowded primary side of the PCB, but drilled holes that extend all the way through the PCB make circuit routing and connection very difficult in the middle layers of the board.

The present solution is directed to overcoming the problems set forth above. It is desirable to have a backlit keypad and/or LCD panel for an instrument, such as a cellular telephone, that does not require direct fixed connection to a printed circuit board. It is also desirable to have such a backlit keyboard in which the electrical contacts of a light-emitting diode, providing backlighting of a keypad and/or LCD are maintained in biased contact with contacts provided on the secondary side of the printed circuit board. It is also desirable to have such a keyboard assembly that does not require components to be solder-mounted on the secondary side of the printed circuit board. Furthermore, it is desirable to have such a keyboard assembly in which the backlight-providing LEDs are insert molded or otherwise embedded in a translucent elastomeric material forming the keypad and/or adjacent light guides directing light to the back side of an LCD panel.

SUMMARY OF THE INVENTION

In accordance with one aspect of the present invention, a keyboard assembly includes a keypad formed of a translucent elastomeric material, and a light-emitting diode embedded within the translucent elastomeric material of the keypad with a pair of electrical contacts that are not covered by the translucent elastomeric material. The keyboard assembly also includes a printed circuit board having a pair of electrical contacts disposed on a secondary surface of the board in alignment with the pair of electrical contacts of the light-emitting diode when the keypad is assembled with the printed circuit board. The keyboard further includes a cover that is assembleable with the keypad and the printed circuit board, and adapted to provide a bias force urging the light-emitting diode embedded in the elastomeric material in a direction toward the secondary surface of the printed circuit board when the keypad, printed circuit board and cover area assembled together.

Other features of the keyboard assembly embodying the present invention include the assembly having a liquid crystal display panel disposed adjacent the translucent elastomeric keypad, a light guide adapted to direct light to a back side of the liquid display panel, and an additional light-emitting diode embedded in the translucent keypad at a position adjacent the light guide. Other features include the additional light-emitting diode being a side-emitting diode, and the translucent elastomeric material being silicone rubber.

In accordance with another aspect of the present invention, a keyboard assembly includes a liquid crystal display panel having a light guide adapted to direct light to a back side of the liquid crystal display panel, an elastomeric member formed of a translucent material, extending along at least one side of the panel in light-transmitting communication with the light guide of the liquid crystal display panel. The keyboard assembly further includes a light-emitting diode embedded in the elastomeric member at a position adjacent the light guide and having a pair of electrical contacts not covered by the elastomeric member. The keyboard further comprises a printed circuit board having a pair of contacts disposed on a secondary surface in alignment with the pair of contacts of the light-emitting diode when the liquid crystal display panel is assembled with the printed circuit board. Still further, the keyboard assembly comprises a cover assembleable with the liquid crystal display panel, the elastomeric member, and the printed circuit board, and adapted to provide a bias force that urges the light-emitting diode embedded in the elastomeric member in a direction toward the secondary surface of the printed circuit board when the cover, the liquid crystal display panel, the elastomeric member and the printed circuit board are assembled together.

Other features of the invention embodying the present invention include the keyboard assembly having a keypad formed of a translucent elastomeric material that includes the elastomeric member extending along at least one side of a liquid crystal display panel. Other features of the keyboard assembly include the light-emitting diode embedded in the elastomeric member, being a side-emitting diode.

In accordance with yet another aspect of the present invention, a keyboard assembly has a keyboard formed of a translucent material, a light guide formed of a light-transmitting material disposed adjacent a lower surface of the keypad, and a light-emitting diode embedded within the light guide. The keyboard also includes a printed circuit board having a pair of electrical contacts disposed on a secondary surface that are in alignment with a corresponding pair of electrical contacts of the light-emitting diode embedded in the light guide. A cover provides a bias force against the keypad when the keypad, light guide and printed circuit board are assembled together in the cover, and maintains the electrical contacts of the light emitting diode embedded in the light guide in electrical communication with the electrical contacts provided on the printed circuit board.

In accordance with still another aspect of the present invention, a method of forming a keyboard assembly includes inserting a light-emitting diode having a pair of electrical contacts into a predefined position in a mold, closing the mold to form a defined mold cavity, and inserting a liquefied elastomeric material into said mold cavity whereby the light-emitting diode is substantially embedded within the elastomeric material. The method further includes at least partially curing the elastomeric material and thereby forming a keypad, before removing the thus-formed keypad, with the light-emitting diode embedded therein, from the mold cavity. The method further includes providing a printed circuit board having a secondary surface with a pair of electrical contacts provided thereon, providing a cover, and assembling the printed circuit board and the molded keypad together with the cover whereby the electrical contacts of the light-emitting diode are maintained in biased contact with the electrical contacts of the printed circuit board.

Other features of the method of forming a keyboard assembly embodying the present invention include the elastomeric material being a translucent silicone rubber compound an the light-emitting diode being a diode that emits light in either a vertical or an orthoganol direction with respect to the electrical contacts of the diode. Still other features include the step of inserting the liquefied elastomeric material into the mold cavity includes injecting the liquefied elastomeric material, under pressure, into the mold cavity.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
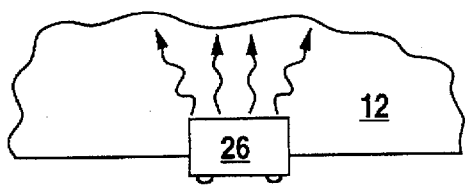
FIG. 1 is a schematic representation of a vertical-emitting diode embedded in the keypad of a keyboard assembly embodying the present invention.

A keyboard assembly 10 embodying the present invention is adapted for use in various instruments using keypads or LCD panels, for example, portable telecommunication instruments such as cellular telephones. Importantly, the keyboard assembly 10 includes a keypad 12 formed of a translucent elastomeric material, such as silicone rubber. The keypad 12 has a plurality of keys which extend through openings provided in a cover 14. The top surfaces of the keys are typically imprinted with a black material to form numbers or characters representative of the function of the key. Alternatively, the entire top of the key may be coated with a black material with a cutout representative of the number or character. The individual keys are typically separately depressed to bring the bottom of the key into contact with electrical contacts, not shown, provided on a printed circuit board (PCB) 16 underlying the keypad 12.

In the present invention, the printed circuit board 16 preferably has all electrical components, represented by the number 18 in the drawings, attached, such as by soldering or surface-mount techniques to only the primary side 20 of the PCB 16. Electrical contacts, or more specifically contact pads, 22 are provided on a secondary side 24 of the PCB 16. As noted above, if only one side of the PCB has electrical components mounted on it, the PCB only needs to go through one pick-and-place machine and surface-mount-device line, resulting in substantial time and cost benefits in the manufacture of the completed PCB. Also, as noted above, the secondary side of the PCB is typically used to mount the user interface components, i.e., the LCD, earphone, microphone, and keypad. All of the secondary side components are capable of being connected to the printed circuit board using elastomeric or other solderless type of connectors. However, the display and keypad typically must be backlit so that the user can place a call in dark conditions. Currently, the light-emitting diodes (LEDs) used to light the display and keypad are surface-mount soldered to the printed circuit board, requiring a second surface-mount-device line in the assembly operation, or secondary robotic soldering operations during assembly.

In the present invention, a plurality of light-emitting diodes 26, only one of which is shown in the drawings, are embedded in the silicone rubber keypad 12 at a position that, when the keypad 12 is assembled on the PCB 16, the electrical contacts 28 on the LED 26 are brought into contact with the corresponding conductive pads 22 on the PCB 16. The term "embedded", as used herein and to the LEDs 26, with respect to the LEDs 26, means that the LEDs 26 are substantially enclosed by, and in intimate contact with, the surrounding mass of light-transmitting material. Preferably, the LEDs 26 are insert molded with the surrounding material, as described below in greater detail. Alternatively, pockets, or recesses, having dimensions equal to or slightly less than the outer dimensions of the LEDs 26 may be formed in the molded article and the LEDs 26 inserted into the formed pockets after molding. As can be seen in the drawings, the cover 14 has openings 30 through which the individual keys of the keypad extend. The portion of the cover 14 extending around the perimeter of the keys, between the keys, and around a liquid crystal display panel 32 if so provided, compresses the webs of the elastomeric keypad 12 extending between the keys and around the LCD panel 32.

Figure 2:
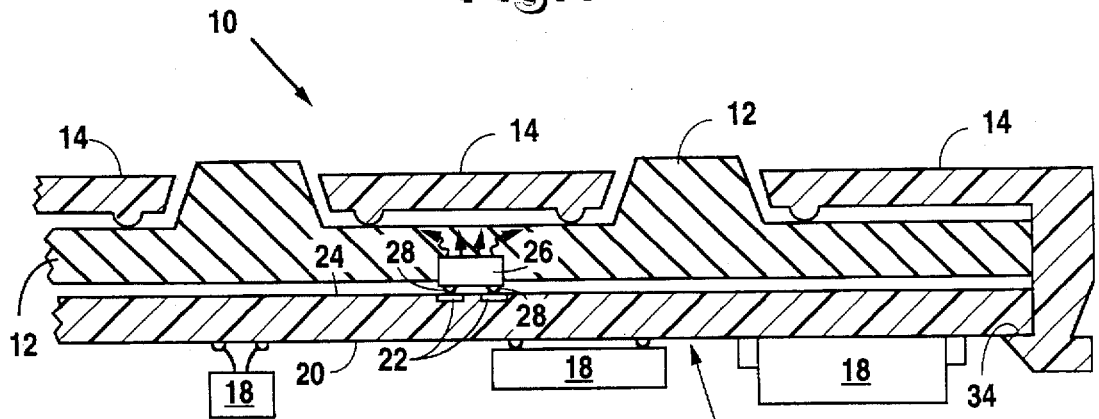
FIG. 2 is a cross-sectional view of the schematic representation shown in FIG. 1, showing details of the keyboard assembly embodying the present invention.
Figure 4:
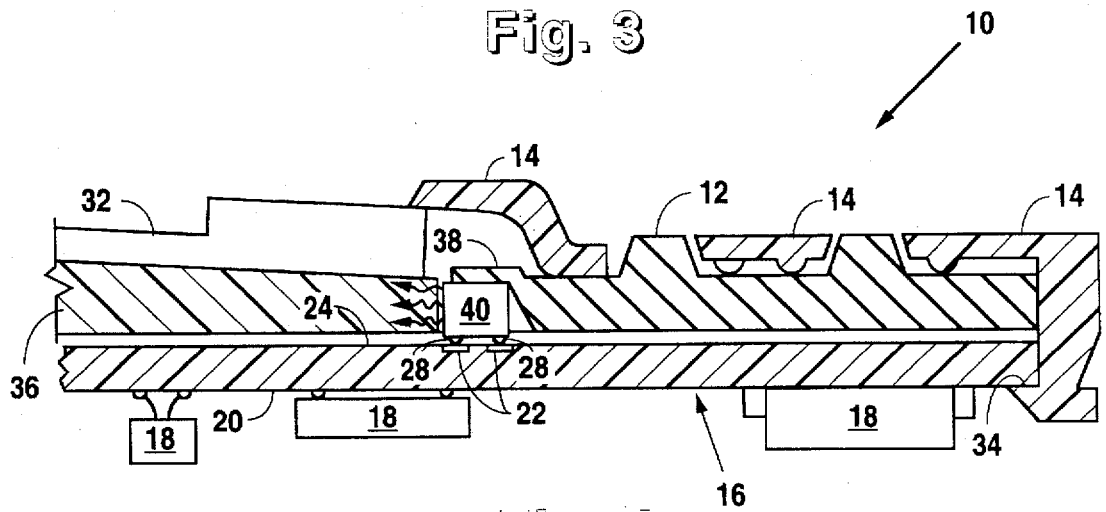
FIG. 4 is a cross-sectional view showing details of the keyboard assembly arrangement shown in FIG. 3.

As shown in FIGS. 2 and 4, the elastomeric keypad 12 and printed circuit board 16 are tightly held within the cover 14 by an inwardly extending lip 34 extending around the perimeter of the cover 14. The clearance between the lip 34 and the bottom surface of the cover 14 is somewhat less than the combined uncompressed thickness of the elastomeric keypad 12 and printed circuit board 16. Thus, in this embodiment, the assembled cover 14 compreses the keypad 12 and thereby provides means for producing a bias force that urges the light-emitting diodes 26 embedded in the elastomeric keypad 12 in a direction toward the secondary surface 24 of the printed circuit board 16 when the keypad 12 and the printed circuit board 16 are assembled together, in the cover. The bias force provided by the cover 14, after assembly with the keypad 12 and PCB 16, maintains the electrical contacts of the light-emitting diodes 26 in electrical communication with the electrical contacts 22 disposed on the secondary surface 24 of the printed circuit board 16. Alternatively, the means for providing the above-described bias force may be provided by appropriately positioned screws or clamps.

In the arrangement shown in FIGS. 1 and 2, the LED 26 is a conventional vertical-emitting diode that directs light upwardly in a vertical direction with respect to the base, or contact side, of the diode. In this arrangement, light is diffused into the translucent keypad 12 and dispersed in a manner that provides backlighting for each of the keys of the keypad 12. The number of LEDs 26, and their positioning, may be selected to provide backlighting in any desired pattern. For example, the LED may be positioned between two adjacent keys, as shown in FIG. 2, at the interstice between four keys, directly under each key, or at only one central location. The positioning of the LED is strictly a matter of design choice and design illumination brightness.

Backlighting for a liquid crystal display panel is typically provided by light guides that extend under the panel. In the present invention, a light guide 36 is mounted adjacent a peripheral surface of the keypad 12 which may be regarded as an elastomeric member 38 either formed integrally with, or separately from, the keypad 12. A side-emitting LED 40 is embedded in the elastomeric member 38 at a position adjacent the light guide 36 in light-transmitting communication with the light guide 36 of the LCD 40. In this embodiment, shown in FIGS. 3 and 4, a plurality of side-emitting LEDs 40, in which light is emitted at right angles with respect to the base or contact side of the LED, may be provided as required along at least one edge of the LCD panel 32 to provide light to the light guide 36 positioned under the LCD 32.

Figure 5:
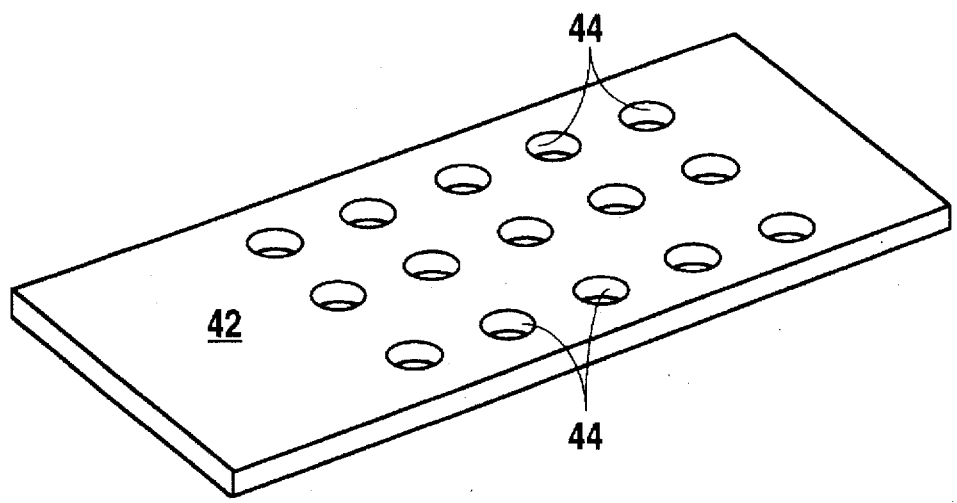
FIG. 5 is a three-dimensional view of a light guide component in an alternate embodiment of the keyboard assembly embodying the present invention.
Figure 6:
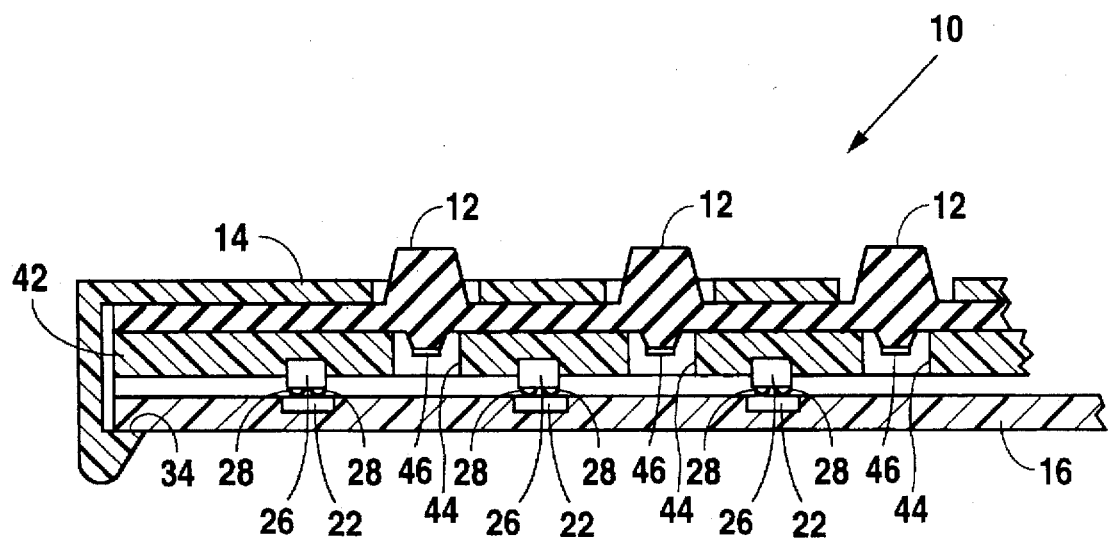
FIG. 6 is a cross-sectional view of an alternate embodiment of the keyboard assembly embodying the present invention.

In an alternate embodiment illustrated in FIGS. 5 and 6, the keyboard assembly 10 includes a light guide 42 formed of a light-transmitting material such as a preferably rigid, transparent or translucent, polymer material. The light guide 42 has a plurality of apertures, or through-holes, 44 to allow a conductor 46 on the bottom of each of the keys to contact respectively positioned contacts provided on the secondary side 24 of the printed circuit board 16. In this embodiment, the LEDs 26 are embedded, either by insert molding or insertion into preformed pockets subsequent to molding or fabrication, in the light guide 42. Upon assembly of the keyboard assembly 10, the cover 14 compresses the elastomeric keypad 12, in the manner described above, and thereby provides a bias force that maintains the contacts 28 of the LED s 26 in electrical communication with the electrical contact pads 22 on the secondary side 24 of the PCB 16.

Figure 3:
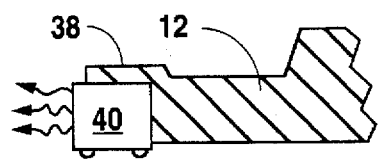
FIG. 3 is a schematic representation of an embedded side-emitting diode used in another arrangement of the keyboard assembly embodying the present invention.

While only a vertical emitting LED 26 is shown in the arrangement described with respect to FIGS. 1, 2, and 6, and only a side-emitting LED 40 is shown in arrangement described with respect to FIGS. 3 and 4, it should be recognized that in a keyboard assembly having both an LCD panel 32 and a keypad 12, both arrangements of LEDs 26, 40 may be included in the same keyboard assembly 10.

Figure 7:
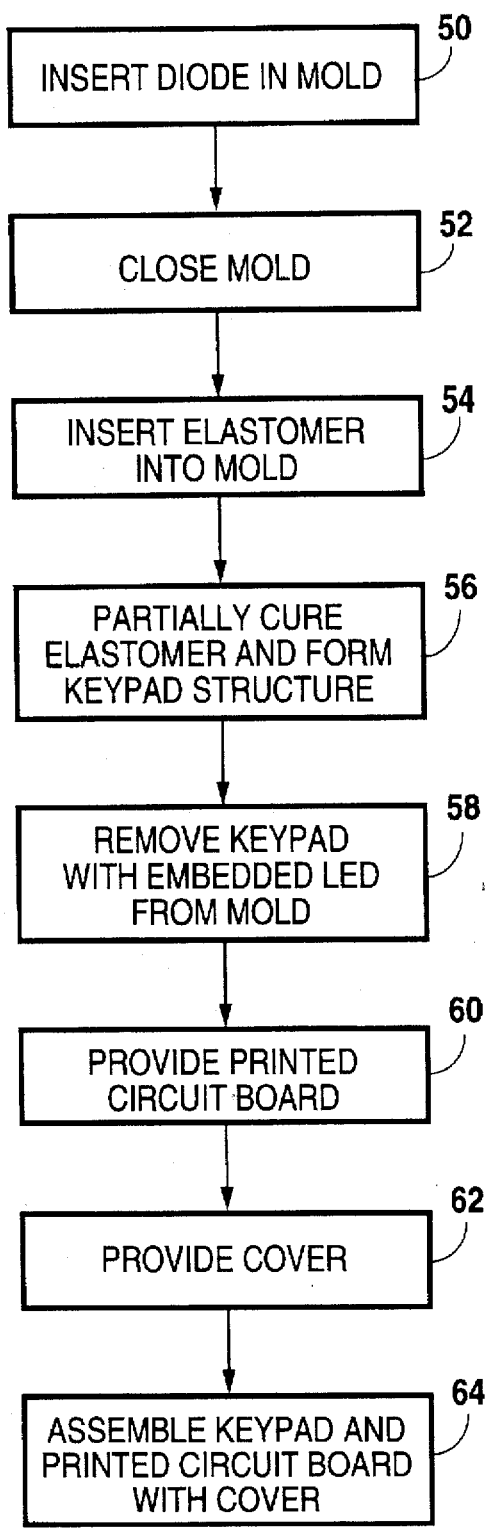
FIG. 7 is a flow chart showing the primary steps in the method of forming a keyboard in accordance with the present invention.

A method for forming a keyboard assembly 10, embodying the present invention, will now be described with reference to the flow chart shown as FIG. 7. The method includes the steps of inserting at least one, and preferably a plurality of, light-emitting diodes, either vertically emitting diodes 26, side-emitting diodes 40, or both, or other arrangement of light-emitting diodes into a predefined position in a mold, as indicated at block 50. Typically, light-emitting diodes have two electrical contacts 28 provided on the base of the diode, and it is desirable that during molding the contacts not become covered by the mold material. If they should become covered with the molded material, which is electrically nonconductive, then that material should be removed from the contacts 28 prior to final assembly.

After insertion of the LEDs 28, 40 into the mold, the mold is closed as indicated at block 52 and liquefied, i.e., uncured, elastomeric material is inserted into the mold cavity, preferably by injection under pressure, as indicated at block 54. Silicone rubber typically has an injection molding temperature that is considerably lower than the temperature produced in convection ovens used to reflow solder in the course of attaching LEDs to a PCB. Hence, the LEDs 28, 40 will not be damaged by the processing temperatures incurred during the molding operation. Furthermore, light transmission between the LEDs 26, 40 and the keypad 12 and/or separate elastomeric member 38 adjacent the light guide 36 of the LCD 32, will be enhanced because of the absence of an air gap interface between the components. Light goes directly from the LEDs 26, 40 into the translucent silicone rubber media.

The molded keypad 12, with the insert-molded LEDs 26, 40 embedded therein, is allowed to at least partially cure in the mold, as indicated at block 56, so that the thus-formed keypad 12 can be handled without damage to its structure upon removal from the mold. The at least partially cured keypad 12, with the embedded diodes 26, 40 integrally encapsulated therein, is then removed from the mold, as indicated at block 58.

A printed circuit board 16, as represented at block 60 and a cover 14 as indicated at block 62 are then provided and assembled together with the molded elastomeric keypad 12, as represented at block 64. In the alternative embodiment illustrated in FIGS. 5 and 6, the light guide 42, with LEDs 26 embedded in the lower surface of the light guide, is positioned between the keypad 12 and the PCB 16 before assembly with the cover 14.

Furthermore, in all of the above-described embodiments, it is desirable that the printed circuit board 16, provided as represented at block 60, have electrical components mounted on only the primary side of the board, with only electrical contacts or pads provided on the secondary side of the board. It should further be noted that the resiliency of the silicone rubber material is able to take up slight manufacturing tolerances between the front cover 14 and a printed circuit board 16, allowing firm, biased contact between the electrical contacts 28 of the LEDs 26, 40 and their corresponding pads or contacts 22 on the printed circuit board 16, similar to the way in which elastomeric connectors function. Thus, in the keyboard assembly 10 embodying the present invention, no secondary operations are required to mount surface components or provide solder connections between the LEDs 26, 40 and secondary side 24 of the PCB 16. Moreover, the overall thickness of the instrument 10 can be significantly reduced if all of the electrical components 18 are mounted on only the primary side 20 of the printed circuit board 16.

Thus, it can be seen that the present invention provides a keyboard assembly, and method for forming the assembly, that is cost effective and provides improved operating advantages and reduced instrument profile because of the intimate, embedded, position of the LEDs directly into the translucent elastomeric material of the keypad.

Although the present invention is described in terms of preferred exemplary embodiments, with specific illustrative key constructions and component arrangements, those skilled in the art will recognize that changes in those arrangements and constructions may be made without departing from the spirit of the invention. Such changes are intended to fall within the scope of the following claims. Other aspects, features and advantages of the present invention may be obtained from a study of this disclosure and the drawings, along with the appended claims.

What I claim is:

1. A keyboard assembly, comprising:

a keypad formed of a translucent elastomeric material;

a light-emitting diode embedded within said translucent elastomeric material of the keypad and having a pair of electrical contacts not covered by said translucent elastomeric material;

a printed circuit board having a pair of electrical contacts disposed on a secondary surface of the board in alignment with said pair of electrical contacts of the light-emitting diode when said keypad is assembled with said printed circuit board; and means for providing a bias force urging said light-emitting diode embedded in said elastomeric material in a direction toward said secondary surface of the printed circuit board when said keypad and said printed circuit board are assembled together and maintain the electrical contacts of the light-emitting diode in electrical communication with the electrical contacts disposed on the secondary surface of the printed circuit board.

2. A keyboard assembly, as set forth in claim 1, wherein said means for providing a bias force includes a cover assembleable with said keypad and said printed circuit board.

3. A keyboard assembly, as set forth in claim 1, wherein said translucent elastomeric material is silicone rubber.

4. A keyboard assembly, as set forth in claim 1, wherein said secondary side of the printed circuit board includes only electrical contacts and said printed circuit board has a primary side on which electrical components are mounted.

5. A keyboard assembly, as set forth in claim 1, wherein said light-emitting diode is insert-molded in said translucent elastomeric material.

6. A keyboard assembly, as set forth in claim 1, wherein said keyboard assembly is adapted for use in a cellular telephone.

7. A keyboard assembly, as set forth in claim 1, wherein said assembly includes a liquid crystal display panel disposed adjacent said translucent elastomeric keypad, a light guide adapted to direct light to a backside of the liquid crystal display panel, and an additional light-emitting diode embedded in said translucent elastomeric keypad at a position adjacent said light guide.

8. A keyboard assembly, as set forth in claim 2, wherein said additional light-emitting diode emits light through a side of the diode.

9. A keyboard assembly, comprising:

a liquid crystal display panel having a light guide adapted to direct light to a backside of the liquid crystal display panel;

an elastomeric member formed of a translucent material and extending along at least one side of said liquid crystal display panel;

a light-emitting diode embedded in said elastomeric member at a position adjacent said light guide in light-transmitting communication with said light guide of the liquid crystal display panel and having a pair of electrical contacts not covered by said elastomeric member; and a printed circuit board having a pair of contacts disposed on a secondary surface in alignment with said pair of contacts of said light-emitting diode when said liquid crystal display panel is assembled with said printed circuit board, and a cover assembleable with said liquid crystal display panel, said elastomeric member and said printed circuit board and adapted to provide a bias force urging said light-emitting diode embedded in said elastomeric member in a direction toward said secondary surface of the printed circuit board when said cover, said liquid crystal display panel, said elastomeric member and said printed circuit board are assembled together, and maintain the electrical contacts of the light-emitting diode in electrical communication with the electrical contacts disposed on the secondary surface of the printed circuit board.

10. A keyboard assembly, as set forth in claim 9, wherein said light-emitting diode emits light through a side of the diode.

11. A keyboard assembly, as set forth in claim 9, wherein said secondary side of the printed circuit board includes only electrical contacts and said printed circuit board has a primary side on which electrical components are mounted.

12. A keyboard assembly, as set forth in claim 9, wherein said keyboard assembly is adapted for use in a cellular telephone.

13. A keyboard assembly, as set forth in claim 9, wherein said assembly includes a keypad formed of a translucent elastomeric material and said elastomeric member extending along at least one side of said liquid crystal display panel comprises an integrally-formed portion of the keypad.

14. A keyboard assembly, as set forth in claim 13, wherein said light-emitting diode is insert-molded in said keypad.

15. A keyboard assembly, comprising:

a keypad having a plurality of keys disposed on an upper surface and a lower surface spaced from said upper surface, said keypad being formed of a translucent elastomeric material;

a light guide disposed adjacent said lower surface of the keypad, said light guide being formed of a light-transmitting material;

a light-emitting diode embedded within said light guide and having a pair of electrical contacts not covered by said light-transmitting material of the light guide;

a printed circuit board having a pair of electrical contacts disposed on a secondary surface of the board in alignment with said pair of electrical contacts of the light-emitting diode when said light guide is assembled with said printed circuit board; and a means for providing a bias force urging said light-emitting diode embedded in said light guide in a direction toward said secondary surface of the printed circuit board when said keypad, said light guide and said printed circuit board are assembled together and maintain the electrical contacts of the light-emitting diode in electrical communication with the electrical contacts disposed on the secondary surface of the printed circuit board.

16. A keyboard assembly, as set forth in claim 15, wherein said means for providing a bias force includes a cover assembleable with said keypad, said light guide, and said printed circuit board.

17. A keyboard assembly, as set forth in claim 15, wherein said light guide is formed of a substantially rigid polymer material.

18. A keyboard assembly, as set forth in claim 15, wherein said light-emitting diode is insert-molded in said light guide.

19. A method of forming a keyboard assembly, comprising:

inserting a light-emitting diode having a pair of electrical contacts into a predefined position in a mold;

closing said mold to form a defined mold cavity;

inserting a liquefied elastomeric material into said mold cavity whereby said light-emitting diode is substantially embedded in said elastomeric material;

at least partially curing said elastomeric material and thereby forming a keypad having a light-emitting diode embedded therein;

removing said formed keypad from said mold cavity;

providing a printed circuit board having a secondary surface with a pair of electrical contacts provided thereon;

providing a cover;

assembling said printed circuit board and said molded keypad together with said cover whereby said electrical contacts of said light-emitting diode is maintained in biased contact with said electrical contacts of said printed circuit board.

20. A method of forming a keyboard assembly, as set forth in claim 19, wherein said elastomeric material is a translucent silicone rubber compound.

21. A method of forming a keyboard assembly, as set forth in claim 19, wherein said light-emitting diode emits light in a vertical direction with respect to said electrical contacts of the diode.

22. A method of forming a keyboard assembly, as set forth in claim 19, wherein said light-emitting diode emits light in an orthogonal direction with respect to said electrical contacts of the diode.

23. A method of forming a keyboard assembly, as set forth in claim 19, wherein said inserting a liquefied elastomeric material into said mold cavity includes injecting said liquefied elastomeric material, under pressure, into said mold cavity.

24. A method of forming a keyboard assembly, as set forth in claim 19, wherein said keyboard assembly is adapted for use in a cellular telephone.

* * * * *